(12) United States Patent
Labocki

(10) Patent No.: US 9,729,465 B2
(45) Date of Patent: Aug. 8, 2017

(54) POLICY BASED APPLICATION ELASTICITY ACROSS HETEROGENEOUS COMPUTING INFRASTRUCTURE

(71) Applicant: Red Hat, Inc., Raleigh, NC (US)

(72) Inventor: James Joshua Labocki, Dunedin, FL (US)

(73) Assignee: RED HAT, INC., Raleigh, NC (US)

( * ) Notice: Subject to any disclaimer, the term of this patent is extended or adjusted under 35 U.S.C. 154(b) by 648 days.

(21) Appl. No.: 13/875,176

(22) Filed: May 1, 2013

(65) Prior Publication Data

US 2014/0330974 A1    Nov. 6, 2014

(51) Int. Cl.
| G06F 15/173 | (2006.01) |
| H04L 12/911 | (2013.01) |
| H04L 29/08 | (2006.01) |
| H04L 29/06 | (2006.01) |

(52) U.S. Cl.
CPC .......... *H04L 47/70* (2013.01); *H04L 63/0272* (2013.01); *H04L 63/08* (2013.01); *H04L 63/10* (2013.01); *H04L 63/20* (2013.01); *H04L 67/1004* (2013.01)

(58) Field of Classification Search
CPC ............................. H04L 47/70; H04L 12/911
USPC ........................................................ 709/226
See application file for complete search history.

(56) References Cited

U.S. PATENT DOCUMENTS

| 8,161,479 | B2 | 4/2012 | Sedukhin et al. | |
| 2007/0171921 | A1* | 7/2007 | Wookey | G06F 3/1415 370/401 |
| 2008/0059633 | A1* | 3/2008 | Hu | H04L 41/0893 709/225 |
| 2012/0117626 | A1 | 5/2012 | Yates et al. | |
| 2012/0185913 | A1 | 7/2012 | Martinez et al. | |
| 2012/0204187 | A1 | 8/2012 | Breiter et al. | |
| 2012/0260019 | A1 | 10/2012 | Malaiyandisamy et al. | |
| 2012/0265879 | A1* | 10/2012 | Casebolt | G06F 9/5072 709/225 |
| 2013/0019015 | A1 | 1/2013 | Devarakonda et al. | |
| 2014/0068703 | A1* | 3/2014 | Balus | H04L 41/0893 726/1 |

(Continued)

FOREIGN PATENT DOCUMENTS

WO    2012083770 A1    7/2012

*Primary Examiner* — Vivek Srivastava
*Assistant Examiner* — Karina J Garcia-Ching
(74) *Attorney, Agent, or Firm* — Haynes and Boone, LLP

(57) ABSTRACT

A system and method for provisioning resources in a cloud environment are provided. An example system includes a communication module that receives from a requestor running in a cloud environment a request for one or more cloud resources. The example system also includes an identification module that identifies a set of provision policies for the requestor. The example system further includes a resource manager that determines, based on the set of provision policies, whether to approve the request for one or more cloud resources, and that when the request is determined to be approved, determines, based on the set of provision policies, whether to provision one or more physical computing machines and one or more virtual machines for the requestor. The one or more cloud resources is at least one of one or more physical computing machines and one or more virtual machines.

18 Claims, 6 Drawing Sheets

(56) References Cited

U.S. PATENT DOCUMENTS

2014/0075426 A1* 3/2014 West .................. G06F 8/65
              717/171
2014/0281614 A1* 9/2014 Mick ................. G05D 23/1917
              713/322

* cited by examiner

POLICY BASED APPLICATION ELASTICITY ACROSS HETEROGENEOUS COMPUTING INFRASTRUCTURE

FIELD OF DISCLOSURE

The present disclosure generally relates to computing systems, and more particularly to provisioning resources in a heterogeneous computing infrastructure.

BACKGROUND

The advent of cloud-based computing architectures has opened new possibilities for the rapid and scalable deployment of services. In general, a cloud-based architecture deploys a set of hosted resources such as processors, operating systems, software and other components that can be combined together to form virtual machines. A user or customer can request the instantiation of a virtual machine or set of machines from those resources from a central server or cloud management system to perform intended tasks, services, or applications. For example, a user may wish to set up and instantiate a virtual server from the cloud on a temporary basis, for instance, to sell tickets to or merchandise for an upcoming sports or musical performance. The user can subscribe to the set of resources needed to build and run the set of instantiated virtual machines on a comparatively short-term basis, such as hours or days, for the user's intended application.

BRIEF SUMMARY

This disclosure relates to provisioning resources in a heterogeneous computing infrastructure. Methods, systems, and techniques for provisioning resources in a heterogeneous computing infrastructure are disclosed.

According to an embodiment, a system for provisioning resources in a cloud environment includes a communication module that receives from a requestor running in a cloud environment a request for one or more cloud resources. The requestor is one of an application and an application platform. The system also includes a policy database that stores policies for provisioning cloud resources. The system further includes an identification module that identifies in the policy database a set of provision policies for the requestor. The system also includes a resource manager that determines, based on the set of provision policies, whether to approve the request for one or more cloud resources. When the request is determined to be approved, the resource manager determines, based on the set of provision policies, whether to provision one or more physical computing machines and one or more virtual machines for the requestor. The one or more cloud resources is at least one of one or more physical computing machines and one or more virtual machines.

According to another embodiment, a method of provisioning resources in a cloud environment includes receiving from a requestor running in a cloud environment a request for one or more cloud resources. The requestor is one of an application and an application platform. The method also includes identifying, by one or more processors, a set of provision policies for the requestor. The method further includes determining, based on the set of provision policies, whether to approve the request for one or more cloud resources. The one or more cloud resources is at least one of one or more physical computing machines and one or more virtual machines. The method also includes when the request is determined to be approved, determining, based on the set of provision policies, whether to provision one or more physical computing machines and one or more virtual machines for the requestor.

According to another embodiment, a non-transitory machine-readable medium including a plurality of machine-readable instructions that when executed by one or more processors is adapted to cause the one or more processors to perform a method including receiving from a requestor running in a cloud environment a request for one or more cloud resources, the requestor being one of an application and an application platform; identifying a set of provision policies for the requestor; determining, based on the set of provision policies, whether to approve the request for one or more cloud resources, the one or more cloud resources being at least one of one or more physical computing machines and one or more virtual machines; and when the request is determined to be approved, determining, based on the set of provision policies, whether to provision one or more physical computing machines and one or more virtual machines for the requestor.

BRIEF DESCRIPTION OF THE DRAWINGS

The accompanying drawings, which form a part of the specification, illustrate embodiments of the invention and together with the description, further serve to explain the principles of the embodiments. In the drawings, like reference numbers may indicate identical or functionally similar elements. The drawing in which an element first appears is generally indicated by the left-most digit in the corresponding reference number.

DETAILED DESCRIPTION

Figure 1:
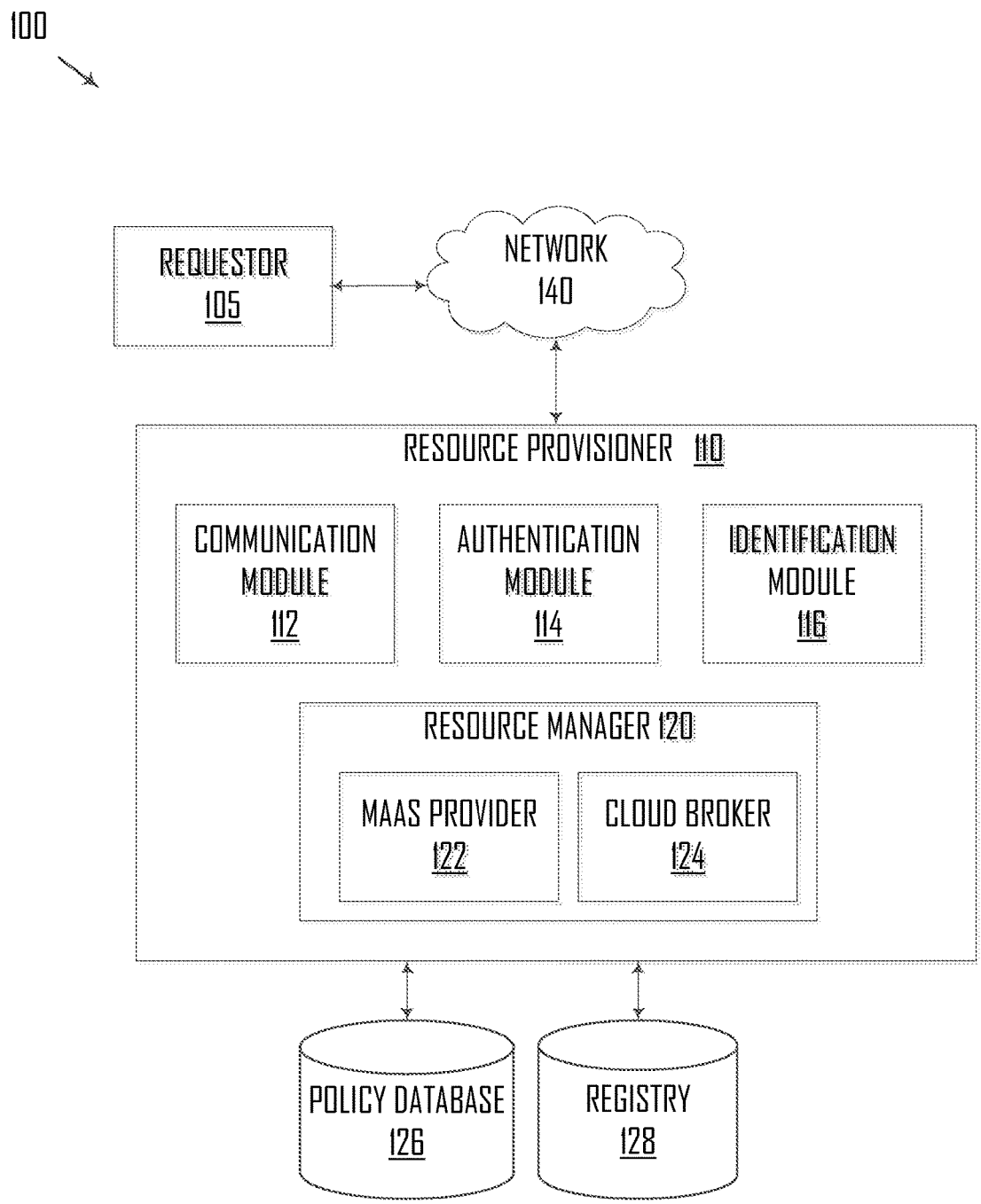
FIG. 1 is a simplified block diagram illustrating a system for provisioning resources in a cloud environment, according to an embodiment.

I. Overview
II. Example System Architectures
  A. Decision to Scale
  B. Authenticate Request for Cloud Resources
  C. Authorize Provision of Cloud Resources
    1. Cloud Broker
    2. Metal-as-a-Service Provider
III. Example Method
IV. Example Computing System
I. Overview It is to be understood that the following disclosure provides many different embodiments, or examples, for implementing different features of the present disclosure. Some embodiments may be practiced without some or all of these specific details. Specific examples of components, modules, and arrangements are described below to simplify the present disclosure. These are, of course, merely examples and are not intended to be limiting.

This disclosure provides techniques to provision resources in a heterogeneous computing infrastructure. A platform as a Service (PAAS) may autoscale operating systems to provide elasticity to an application. A PAAS may provide a software development environment that enables rapid deployment of applications. PAAS may scale the application on an operating system, which is essentially a virtual machine or physical computing machine with the PAAS software installed on it. A PAAS typically does not focus on scaling the underlying nodes. This is understandable because a PAAS does not necessarily understand the underlying infrastructure, nor does it necessarily want to understand the underlying infrastructure. Problems may occur if the PAAS runs out of resources because the PAAS may be unable to add more resources to it.

An application may be associated with systems of engagement and/or systems of record. Systems of engagement may refer to social networking or systems that display various data. In an example, systems of engagement may be programmed on top of a PAAS and may be moved into the PAAS layer with no regard to the legacy infrastructure. Systems of record store data and may be in the IAAS layer. In an Infrastructure-as-a-Service (IAAS) model, the end user may have complete access to and control over the infrastructure components, such as the operating system and the storage.

The legacy application may run on PAAS and the data from the legacy application may be in the infrastructure. A PAAS may auto-scale an application but once the PAAS goes down to the infrastructure layer (e.g., when data is needed from the database), the PAAS may inefficiently access the data down at the IAAS layer. At this point, the application is not scaling at the same rate. When elasticity for the PAAS is desired to meet demand, the traditional infrastructure will likely be impacted and it may be desirable to scale. Additionally, the PAAS may be built on top of an operating system (OS) and may depend on the IAAS to run its infrastructure. Accordingly, being able to scale the PAAS may depend on being able to scale the IAAS. If the PAAS needs to scale, the IAAS may effectively also need to scale.

It may be desirable to provide a single framework for scaling both the PAAS layer and IAAS layer in a generic framework. In this way, the application may be auto-scaled at both the PAAS layer as well as the IAAS layer. In an embodiment, a communication module receives from a requestor running in a cloud environment a request for one or more cloud resources. The requestor is one of an application and an application platform. A policy database may store policies for provisioning cloud resources, and an identification module may identify in the policy database a set of provision policies for the requestor. A resource manager may determine, based on the set of provision policies, whether to approve the request for one or more cloud resources. When the request is determined to be approved, the resource manager may determine, based on the set of provision policies, whether to provision one or more physical computing machines and one or more virtual machines for the requestor. The one or more cloud resources may be at least one of one or more physical computing machines and one or more virtual machines. The provisioned cloud resources may be returned to the requestor for consumption.

II. Example System Architectures

FIG. 1 is a simplified block diagram illustrating a system 100 for provisioning resources in a cloud environment, according to an embodiment.

System 100 includes a resource provisioner 110 that provisions resources in a cloud environment. A requestor 105 may send via a network 140 a request for one or more cloud resources to resource provisioner 110. In an example, the requestor is an application platform that desires more resources. The requesting application platform may be, for example, a PAAS, and the resource provisioner 110 may return resources to the requesting PAAS. The PAAS may request a cloud resource from resource provisioner 110, and resource provisioner 110 may return to the PAAS a virtual machine that can be used by the PAAS to host applications. An example PAAS is OPENSHIFT, provided by RED HAT, INC.

In another example, the requestor is an application that desires more resources. The application may run on a virtual machine or physical computing machine that is not in the PAAS. The physical computing machine may refer to a physical piece of hardware. The resource provisioner 110 may return resources to the requesting application. In an example, the application requests a database from resource provisioner 110, and resource provisioner 110 returns to the application a database that is added to a database cluster associated with the application.

Resource provisioner 110 includes a communication module 112, authentication module 114, identification module 116, and resource manager 120. Resource provisioner 110 may be coupled to network 140. Each of requestor 105 and resource provisioner 110 may communicate with each other over network 140.

Network 140 may include various configurations and use various protocols including the Internet, World Wide Web, intranets, virtual private networks, wide area networks, local networks, private networks using communication protocols proprietary to one or more companies, cellular and other wireless networks. Internet relay chat channels (IRC), instant messaging, simple mail transfer protocols (SMTP), Ethernet, WiFi and HTTP, and various combinations of the foregoing.

In an embodiment, communication module 112 receives from a requestor running in a cloud environment a request for one or more cloud resources. The one or more cloud resources may be one or more physical computing machines and/or one or more virtual machines. In an example, resource provisioner 110 may expose an application programming interface (API) with which the requestor communicates. In this example, the requestor may request more cloud resources by invoking the API.

Resource provisioner 110 may be coupled to a registry 128 that stores a list of valid requestors. Resource provisioner 110 may also be coupled to a policy database 126 that stores policies for provisioning cloud resources.

A. Decision to Scale

It may be difficult for resource provisioner 110 to determine the best way to scale an application or an application platform. It may be advantageous to allow the requestor, rather than resource provisioner 110, to determine when to scale. The requestor may be in the best position to determine when to scale. Resource provisioner 110 may be thought of as a gatekeeper that determines whether or not to allow the requestor to scale.

For example, an application may be written in different programming languages, and each application workload may be different. Additionally, each application may have different requirements for scalability and elasticity. One or more applications may run on a PAAS, and the PAAS may be in the best position to determine whether to scale because the PAAS has a good knowledge of the framework in which the language is running. In an example, the PAAS may easily determine that an APACHE® web server has 10,000 sessions and that another APACHE® instance is needed when the number of sessions running in the APACHE® server reaches 10,000. Accordingly, the PAAS may send a request to resource provisioner 110 for another APACHE® instance. Trademarks are the property of their respective owners.

In another example, a single application runs on PAAS, and PAAS also includes a single database. If the PAAS scales to three nodes, it may be desirable to request an additional database. For the reasons discussed, it may be desirable for the PAAS, rather than resource provisioner 110, to determine that the database should scale. The PAAS may send a request to communication module 112 to request another database. Resource provisioner 110 may, based on the set of policies for the database, provision a database and return to the application identifying information such that the application may use the identifying information to consume the database into the database cluster. In this example, it may be unnecessary for resource provisioner 110 to determine whether the database is taxed and request another database. This may also save resources because it may be unnecessary for resource provisioner 110 to poll an application to determine whether the application is taxed.

B. Authenticate Request for Cloud Resources

To ensure that the requestor is a valid requestor to which resource provisioner 110 may provision resources, a certificate may be used as a form of authentication. In an example, the certificate provides identity to the requestor such that resource provisioner 110 may identify the requestor.

The requestor may exchange certificates with resource provisioner 110. In an example, communication module 112 receives a certificate that identifies the requestor. The certificate may be included in the request for additional cloud resources. In an embodiment, authentication module 114 searches registry 128 to determine whether the requestor is a valid requester. Authentication module 114 may ensure that only a requestor that has been registered in registry 128 can interact with resource provisioner 110 to request resources.

If the requestor is not in registry 128, authentication module 114 determines that the requestor is not a valid requestor. Accordingly, authentication module 114 rejects the request. When the request is rejected, communication module 112 may send a communication to the requestor that the request has been rejected. In contrast, if the requestor is in registry 128, authentication module 114 determines that the requestor is a valid requestor. Accordingly, authentication module 114 authenticates the request. When the request has been authenticated, communication module 112 may send a communication to the requestor that the request has been authenticated and resources will be provisioned to the requestor.

The above example describes certificate-based authentication. This is not intended to be limiting, and other techniques may be used to authenticate the request. For example, resource provisioner 110 may accept a password from the requestor to authenticate the request.

C. Authorize Provision of Cloud Resources

After authentication module 114 authenticates the request, identification module 116 may identify the requestor and the set of provision policies for the requestor. Resource provisioner 110 may provision resources to the requestor based on the policies for the requestor. In an embodiment, identification module 114 identifies in policy database 122 a set of provision policies for the requestor. In an example, a policy may specify where to deploy a cloud resource. For instance, the policy may specify that an application is to be deployed using a first service provider rather than a second service provider because the second service provider is more expensive than the first service provider. In another example, the policy specifies that the requestor has a maximum number of virtual machines from a particular virtualization service provider that may be launched.

Authentication module 114 may run through the certificate to determine the policies for the requestor and the polices that resource provisioner 110 abides by when scaling. This may include decision points such as, for example, on which service providers the application may scale and how many instances the application may consume.

In an embodiment, resource manager 116 determines, based on the set of provision policies, whether to approve the request for one or more cloud resources. Resource manager 116 abides by the policies for the requestor. When the request for one or more cloud resources is approved, resource manager 116 determines, based on the set of provision policies, whether to provision one or more physical computing machines and one or more virtual machines for the requestor. In an example, resource manager 116 determines, based on the set of provision policies, to not provision any cloud resources for the requestor.

In another example, resource manager 116 determines, based on the set of provision policies, to provision a more physical computing machine and/or a virtual machine for the requestor. Resource manager 116 may perform the appropriate actions to communicate with a cloud resource provider such that the cloud resource provider returns the requested cloud resource. In an example, resource manager 116 sends a communication to the cloud resource provider that causes the cloud resource provider to create and send to resource manager 116 the appropriate cloud resource. Resource manager 116, in turn, may provide the cloud resource to the requestor. The requestor may be unaware of which type of cloud resource (e.g., physical computing machine or a virtual machine) is returned by resource manager 116. In this way, it may be unnecessary for the requestor to understand the underlying infrastructure.

In FIG. 1, resource manager 116 includes a metal-as-a-service (MAAS) provider 122 and a cloud broker 124. MAAS provider 122 may provide a set of physical computing machines for the requestor on demand. In an example, MAAS provider 122 provisions an operating system on bare metal. In contrast, cloud broker 124 may provide a set of virtual machines for the requestor on demand. In an example, cloud broker 124 communicates with a set of service providers to launch the set of virtual machines and launch instances to a variety of virtualization managers and cloud service providers, either private and/or public.

MAAS provider 122 or cloud broker 124 may launch or provision the appropriate operating system and configure it per the requestor's requirements. Resource manager 116 may determine, based on one or more policies in policy database 126, whether to provision cloud resources using MAAS provider 122 and/or cloud broker 124. In an example, resource manager 116 sends, based on the determination of whether to provision, a communication to MAAS provider 122 to cause MAAS provider 122 to provision a set of physical computing machines for the requestor. At a later point in time, resource manager 116 may instantiate a virtual machine on a returned physical computing machine. In another example, resource manager 116 sends, based on the determination of whether to provision, a communication to cloud broker 124 to cause cloud broker 124 to provision a set of virtual machines for the requestor.

In another example, resource manager 116 sends, based on the determination of whether to provision, a communication to MAAS provider 122 to provision a set of physical computing machines for the requestor and a communication to cloud broker 124 to cause cloud broker 124 to provision a set of virtual machines for the requestor. In this example, the policy may be set to scale virtual resources and physical systems at the same time.

A developer developing an application may identify policies for the application (e.g., specifications for the application). In an example, the developer may identify that the application is computationally intensive and should be scaled using MAAS. The developer may hand over the policies for the application to an operations team that loads the policies into policy database 126. The application may then autoscale based on the policies.

As discussed in this disclosure and further emphasized here, FIG. 1 is merely an example, which should not unduly limit the scope of the claims. For example, it should be understood that one or more components (e.g., communication module 112, authentication module 114, identification module 116, resource manager 120, MAAS provider 122, and cloud broker 124) may be combined with another component. In an example, at least one of communication module 112, authentication module 114, identification module 116, resource manager 120, MAAS provider 122, and cloud broker 124 is combined into one component. In another example, authentication module 114 and identification module 116 are combined into one component. It should also be understood that one or more components in FIG. 1 (e.g., communication module 112, authentication module 114, identification module 116, resource manager 120, MAAS provider 122, and cloud broker 124) may be separated into more than one component. In an example, cloud broker 124 is split into a first cloud broker and a second cloud broker (not shown). The first cloud broker may communicate with a first service provider, and a second cloud broker may communicate with a second service provider different from the first service provider.

Moreover, each of the components (e.g., communication module 112, authentication module 114, identification module 116, resource manager 120, MAAS provider 122, and cloud broker 124) may reside in a component different from that shown in FIG. 1. For example, MAAS provider 122 and cloud broker 124 may reside in different machines and/or may reside in a machine different from resource manager 120.

Figure 2:
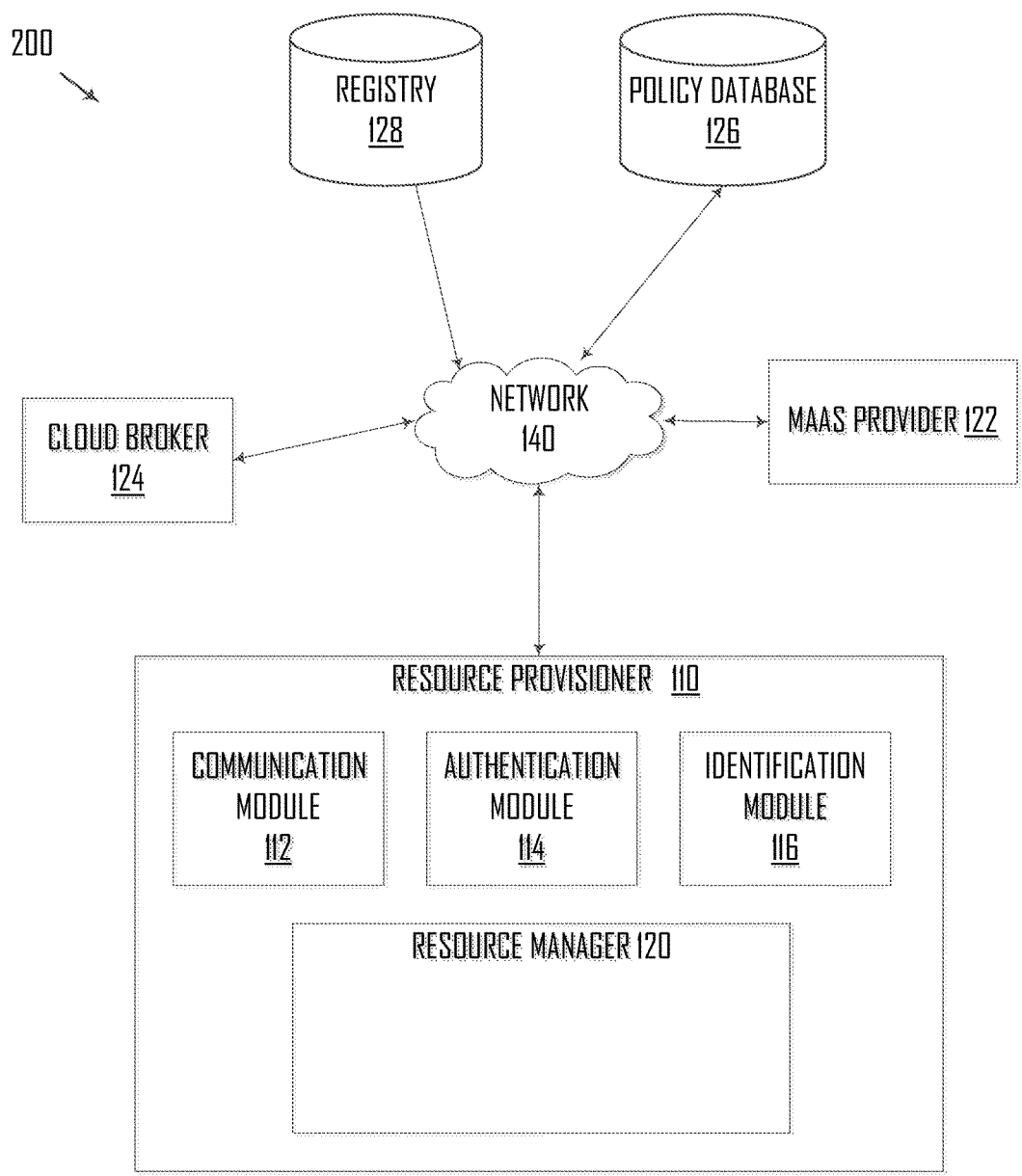
FIG. 2 is a simplified block diagram illustrating a system for provisioning resources in a cloud environment, according to an embodiment.

FIG. 2 is a simplified block diagram illustrating a system 200 for provisioning resources in a cloud environment, according to an embodiment. In FIG. 2, MAAS provider 122 and cloud broker 124 reside in different machines and also reside in a machine different from resource manager 120. Each of resource manager 116, MAAS provider 122, cloud broker 124, policy database 126, and registry 128 may communicate with each other via network 140. Dependent on the set of policies for the requestor, resource manager 116 may send a request over network 140 to MAAS provider 122 and/or cloud broker 124. MAAS provider 122 and/or cloud broker 124 may then receive the request via network 140 and provision the appropriate cloud resources.

1. Cloud Broker

Resource manager 116 may communicate with a set of service providers to cause the set of service providers to provision one or more cloud resources and to return the provisioned resources. A first policy may specify that resource manager 116 communicate with a first service provider to provision cloud resources, and a second policy may specify that the resource manager 116 communicate with a second service provider different from the first service provider to provision cloud resources. To communicate with the first service provider, resource manager 116 may invoke one or more API calls local to the first service provider and receive responses responsive to these API calls. Similarly, to communicate with the second service provider, resource manager 116 may invoke one or more API calls local to the second service provider and receive responses responsive to these API calls. The API calls local to the first service provider, however, may be different from the API calls local to the second service provider. In particular, API calls local to the first service provider may not work on the second service provider. Similarly, API calls local to the second service provider may not work on the first service provider.

In an embodiment, resource manager 116 uses cloud broker 124 to communicate with the first and second service providers. Cloud broker 124 may understand communications specific to this set of service providers. In an example, rather than determine two different API calls in relation to the above example describing first and second service providers, resource manager 116 sends to cloud broker 124 a communication including one or more parameters specifying from which service provider to request cloud resources. Based on the one or more parameters, cloud broker 124 may make the request to the appropriate service provider for cloud resources. In this way, resource manager 116 may write only a single API that is invoked at cloud broker 124 and has the flexibility of deploying resources on any of the different platforms associated with the set of service providers.

Figure 3:
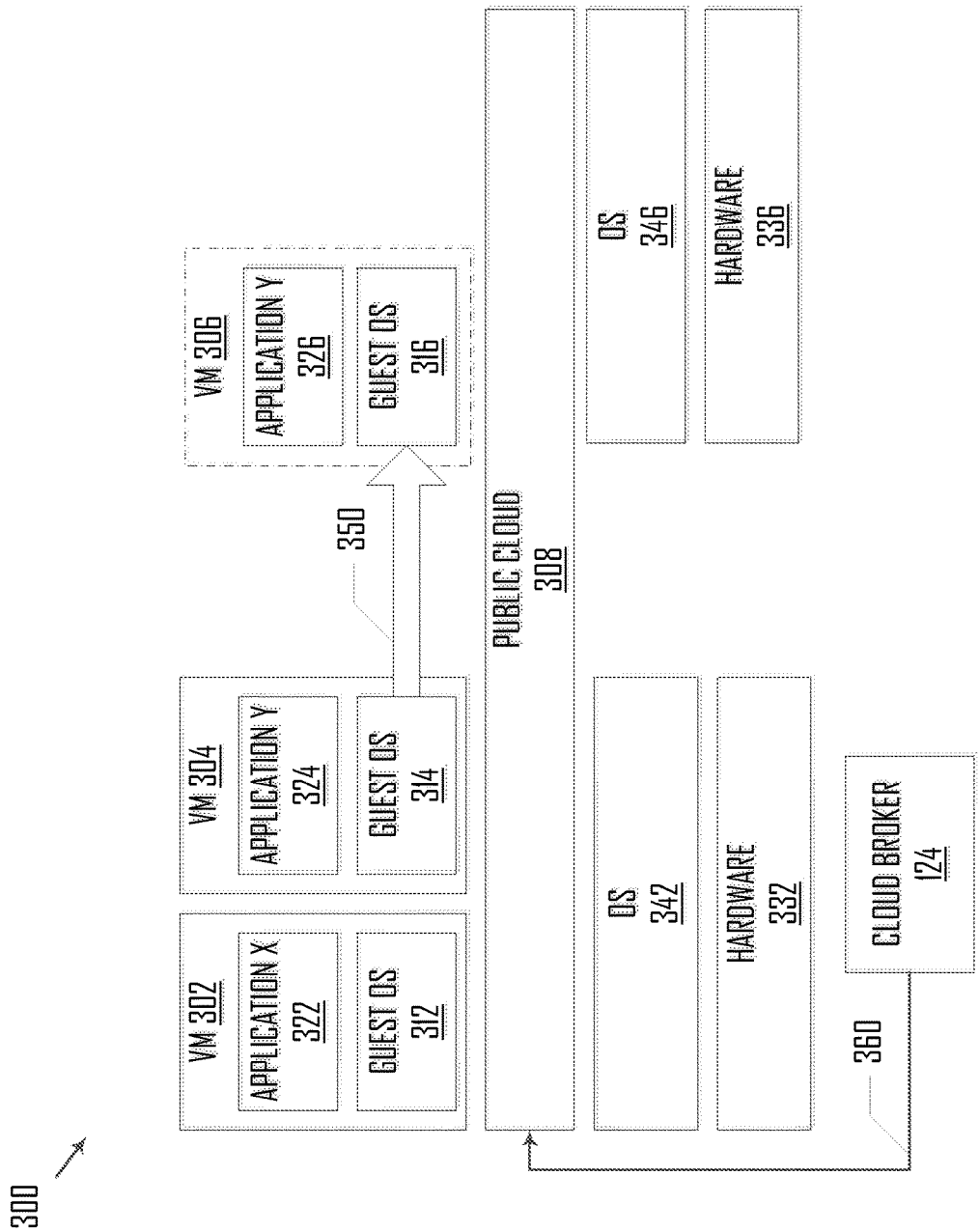
FIG. 3 is a simplified block diagram illustrating a cloud broker provisioning resources in a cloud environment, according to an embodiment.

FIG. 3 is a simplified block diagram 300 illustrating cloud broker 124 provisioning resources in a cloud environment, according to an embodiment. Diagram 300 illustrates a virtual machine (VM) 302 and VM 304 running in a public cloud 308. A VM is a portion of software that, when executed on appropriate hardware, creates an environment allowing the virtualization of an actual physical computing system. In an example, the VM runs in a PAAS. In another example, the VM does not run on a PAAS.

A host machine may be a physical computing machine that runs one or more virtual machines. In an example, a first host machine includes hardware 332 and OS 342 and runs VMs 302 and 304, a second host machine includes hardware 336 and OS 346. Each virtual machine may function as a self-contained platform, running its own OS and software applications (processes). VMs 302, 304 run a guest operating system (OS) 312, 314. VM 302 executes application X 322, and VM 304 executes application Y 324. Each guest OS running in a VM may be different from an OS running on the host machine. The host or guest OS may include, for example, MICROSOFT® WINDOWS®, LINUX®, SOLARIS ®, and MAC® OS. Trademarks are the property of their respective owners.

When an application needs one or more cloud resources, the application may send to resource provisioner 110 a request for the one or more cloud resources. Communication module 112 may receive the request for the cloud resource, authenticate the request, and determine whether to authorize the request.

In an example, resource manager 116 determines, based on the set of provision policies, to provision a VM for the requestor. Resource manager 116 may send a communication to cloud broker 124 to cause cloud broker 120 to provision VM 306 for the application. VM 306 is illustrated using dashed lines to indicate that VM 306 is launched responsive to the application's request for a cloud resource. Cloud broker 124 may send a communication, indicated by arrow 360, to a service provider running in public cloud 308 to launch VM 306. As indicated by arrow 350, guest OS 314 may scale across the virtual infrastructure. Cloud broker 124 may return the provisioned resource, VM 306, to resource manager 116. Resource manager 116 may then send information to the application that enables the application to consume VM 306.

Resource manager 116 may send a communication to cloud broker 124 to cause cloud broker 124 to identify, based on the set of provision policies, a first service provider to launch at least one VM of the set of VMs. The communication may also cause cloud broker 124 to transmit to the requestor information identifying a launched VM of the set of VMs. The requestor may use the identifying information to consume the VM. The identifying information may include any information that enables the requestor to access the provisioned resources. In an example, the identifying information includes an Internet Protocol (IP) address of the VM. In another example, the identifying information includes a public key for the VM. When the VM is launched, resource manager 116 may insert a private key into the VM instance and transmit the public key to the requestor.

2. Metal-as-a-Service Provider

It may be advantageous to provision for the requestor a physical computing machine rather than a virtual machine. In an example, an application may adhere to a strict set of performance metrics or a certain level of determinism to satisfy the end user. Running the application on the virtualization servicer provider may not be able to satisfy the certain level of determinism because the provided resource is abstracted. Running the application directly on a physical computing machine, however, may satisfy the certain level of determinism. A policy may be created specifying that when a PAAS running the example application requests more cloud resources, resource manager 116 should use MAAS provider 122 to provision one or more physical computing machines.

Configuring the physical computing machine may be time consuming and prove to be a difficult process. When diving down to the hardware layer, the APIs and interfaces into the physical hardware are typically older and not as sophisticated compared to other APIs and interfaces. Further, other standards may be used at the hardware layer. MAAS provider 122 may abstract away these details and provide an efficient way to provision physical computing machines.

Figure 4:
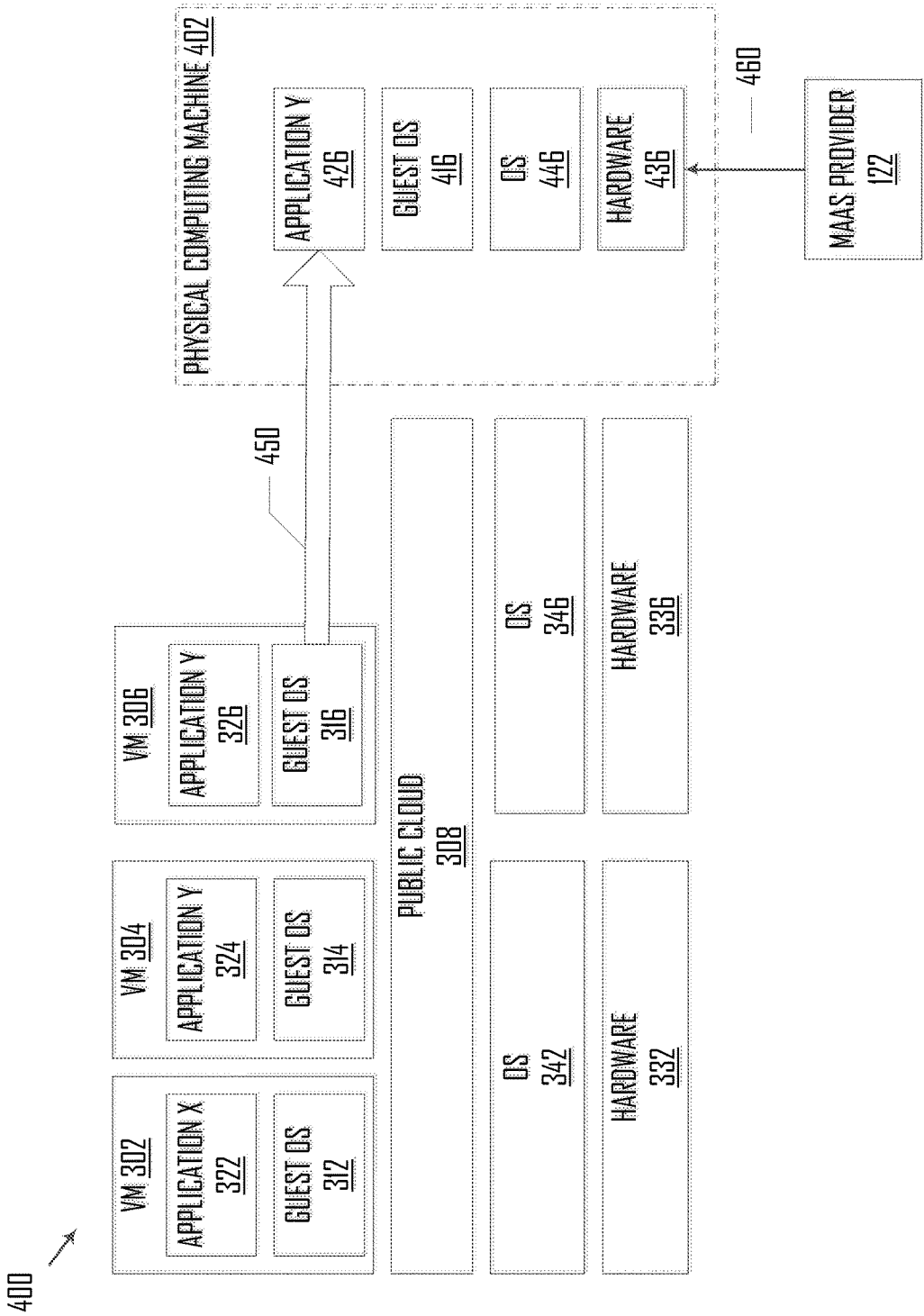
FIG. 4 is a simplified block diagram illustrating a metal-as-a-service provider provisioning resources in a cloud environment, according to an embodiment.

FIG. 4 is a simplified block diagram 400 illustrating MAAS provider 122 provisioning resources in a cloud environment, according to an embodiment. The components in diagram 400 that are also included in diagram 300 may be similar, and for brevity the description of these components will not be repeated here.

In keeping with the above example, resource manager 116 may also determine, based on the set of provision policies, to provision a physical computing machine for the requestor. Resource manager 116 may send a communication to MAAS provider 122 to cause MAAS provider 122 to provision physical computing machine 402 for the application. Physical computing machine 402 is illustrated using dashed lines to indicate that physical computing machine 306 is launched responsive to the application's request for a cloud resource. MAAS provider 122 may send a communication, indicated by arrow 460, to configure physical computing machine 402 for the application.

Physical computing machine 402 includes hardware 432 and OS 442, and runs VM 406. VM 406 runs guest OS 416 and executes application Y 426. As indicated by arrow 450, guest OS 314, 316 may scale across the physical infrastructure. MAAS provider 122 may return the provisioned resource, physical computing machine 402, to resource manager 116. Resource manager 116 may then send information to the application that enables the application to consume physical computing machine 402.

Resource manager 116 may send a communication to MAAS provider 122 to cause MAAS provider 122 to configure the set of physical computing machines for the requestor. When MAAS provider 122 configures a physical computing machine, MAAS provider 122 may perform one or more tasks, such as loading an operating system onto the physical computing machine, adding a Media Access Control (MAC) address to a Pre-Execution Environment (PXE) server, PXE booting the server, and loading the correct initial image. These examples are not intended to be limiting, and MAAS provider 122 may perform other tasks when configuring the physical computing machine.

The communication to MAAS provider 122 may also cause MAAS provider 122 to transmit to the requestor information identifying the set of configured physical computing machines. The requestor may use the identifying information to consume the set of configured physical computing machines. The identifying information may include any information that enables the requestor to access the provisioned resources. In an example, the identifying information includes an Internet Protocol (IP) address of a configured physical computing machine of the set of configured physical computing machines. In another example, the identifying information includes a public key for the physical computing machine. When the virtual machine is launched, resource manager 116 may insert a private key into the physical computing machine and transmit the public key to the requestor.

As discussed in this disclosure and further emphasized here, FIGS. 3 and 4 are merely examples, which should not unduly limit the scope of the claims. For example, although system 300 is described herein with reference to two host machines and system 400 is described herein with reference to three host machines, any number of host machines may be used. Further, a host machine may run one or more virtual machines and one or more applications may be executed by a virtual machine or host machine.

Further, FIGS. 3 and 4 illustrate a private cloud. This is not intended to be limiting and a cloud different from the private cloud (e.g., public and hybrid clouds) is within the scope of the present disclosure. An embodiment supports deploying an application across multiple virtualization technologies (e.g., a virtualization provider, IaaS private cloud, and public cloud). Additionally, an embodiment may be vendor agnostic.

III. Example Method

Figure 5:
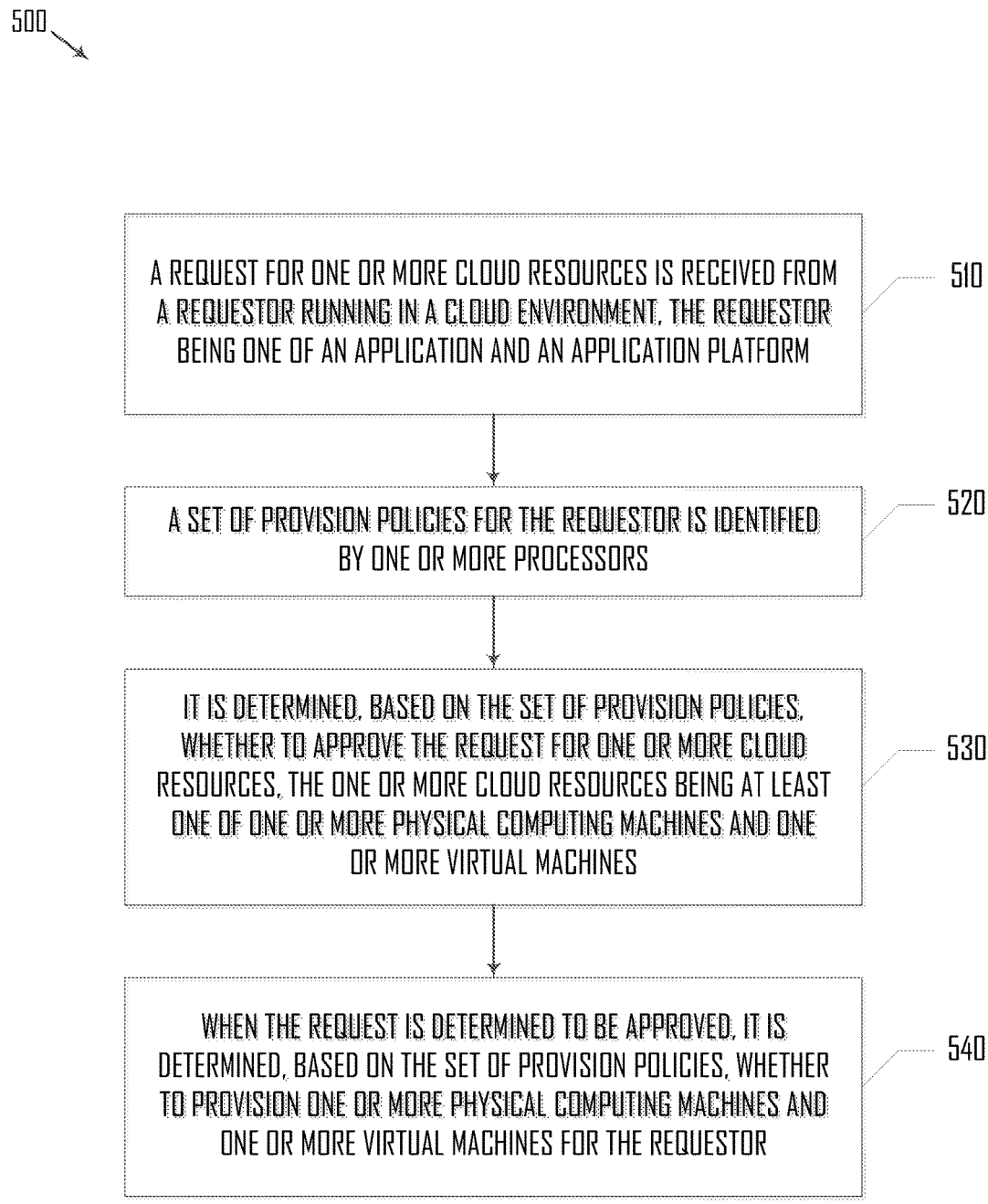
FIG. 5 is a simplified flowchart illustrating a method of provisioning resources in a cloud environment, according to an embodiment.

FIG. 5 is a simplified flowchart illustrating a method 500 of provisioning resources in a cloud environment, according to an embodiment. Method 500 is not meant to be limiting and may be used in other applications.

Method 500 includes steps 510-540. In a step 510, a request for one or more cloud resources is received from a requestor running in a cloud environment, the requestor being one of an application and an application platform. In an example, communication module 112 receives from a requestor running in a cloud environment a request for one or more cloud resources, the requestor being one of an application and an application platform.

In a step 520, a set of provision policies for the requestor is identified by one or more processors. In an example, identification module 114 identifies, by one or more processors, a set of provision policies for the requestor.

In a step 530, it is determined, based on the set of provision policies, whether to approve the request for one or more cloud resources, the one or more cloud resources being at least one of one or more physical computing machines and one or more virtual machines. In an example, resource manager 116 determines, based on the set of provision policies, whether to approve the request for one or more cloud resources, the one or more cloud resources being at least one of one or more physical computing machines and one or more virtual machines.

In a step 540, when the request is determined to be approved, it is determined, based on the set of provision policies, whether to provision one or more physical computing machines and one or more virtual machines for the requestor. In an example, when the request is determined to be approved, resource manager 116 determines, based on the set of provision policies, whether to provision one or more physical computing machines and one or more virtual machines for the requestor.

It is also understood that additional method steps may be performed before, during, or after steps 510-540 discussed above. It is also understood that one or more of the steps of method 500 described herein may be omitted, combined, or performed in a different sequence as desired.

IV. Example Computing System

Figure 6:
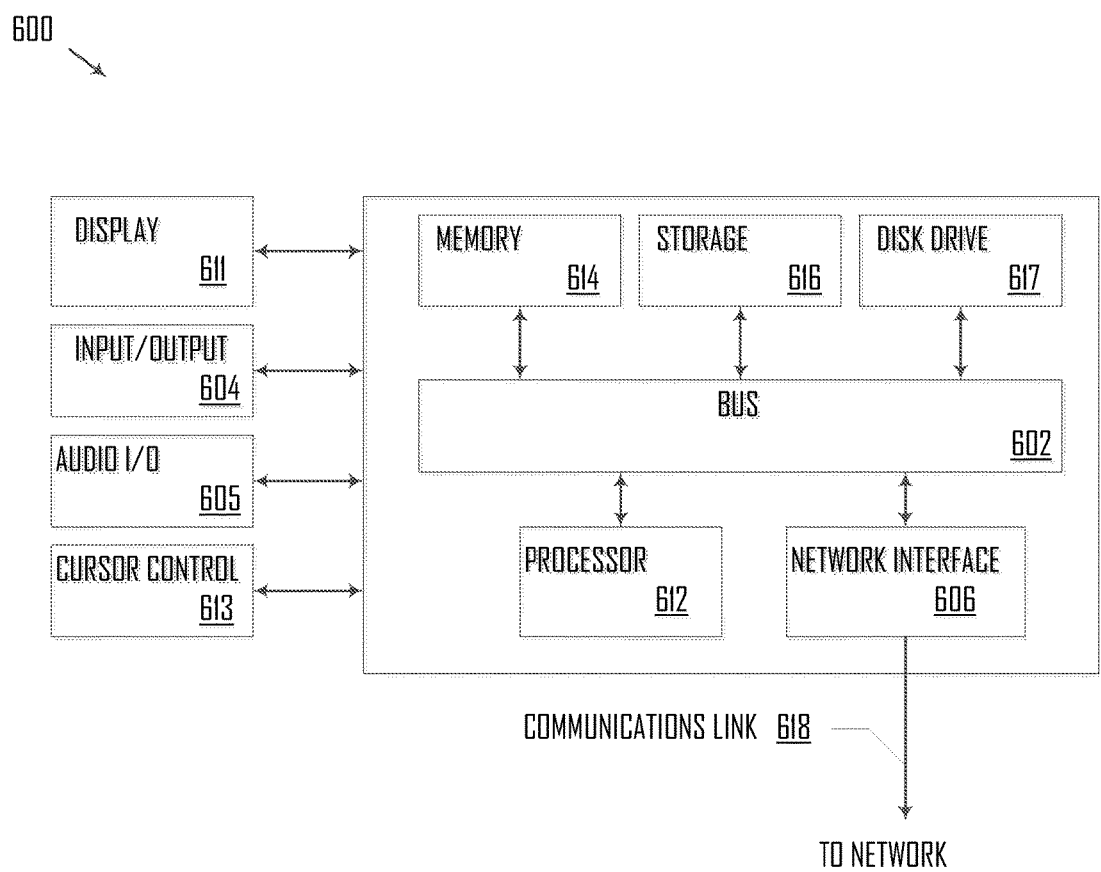
FIG. 6 is a block diagram of an electronic system suitable for implementing one or more embodiments of the present disclosure.

FIG. 6 is a block diagram of a computer system 600 suitable for implementing one or more embodiments of the present disclosure. In various implementations, resource provisioner 110 may include one or more processors. Resource provisioner 110 may additionally include one or more storage devices each selected from a group consisting of floppy disk, flexible disk, hard disk, magnetic tape, any other magnetic medium, CD-ROM, any other optical medium, RAM, PROM, EPROM, FLASH-EPROM, any other memory chip or cartridge, and/or any other medium from which a processor or computer is adapted to read. The one or more storage devices may include stored information that may be made available to one or more computing devices and/or computer programs (e.g., clients) coupled to the client or server using a computer network (not shown). The computer network may be any type of network including a LAN, a WAN, an intranet, the Internet, a cloud, and/or any combination of networks thereof that is capable of interconnecting computing devices and/or computer programs in the system.

Computer system 600 includes a bus 602 or other communication mechanism for communicating information data, signals, and information between various components of computer system 600. Components include an input/output (I/O) component 604 that processes a user action, such as selecting keys from a keypad/keyboard, selecting one or more buttons or links, etc., and sends a corresponding signal to bus 602. I/O component 604 may also include an output component such as a display 611, and an input control such as a cursor control 613 (such as a keyboard, keypad, mouse, etc.). An optional audio input/output component 605 may also be included to allow a user to use voice for inputting information by converting audio signals into information signals. Audio I/O component 605 may allow the user to hear audio. A transceiver or network interface 606 transmits and receives signals between computer system 600 and other devices via a communication link 618 to a network. In an embodiment, the transmission is wireless, although other transmission mediums and methods may also be suitable. A processor 612, which may be a microcontroller, digital signal processor (DSP), or other processing component, processes these various signals, such as for display on computer system 600 or transmission to other devices via communication link 618. Processor 612 may also control transmission of information, such as cookies or IP addresses, to other devices.

Components of computer system 600 also include a system memory component 614 (e.g., RAM), a static storage component 616 (e.g., ROM), and/or a disk drive 617. Computer system 600 performs specific operations by processor 612 and other components by executing one or more sequences of instructions contained in system memory component 614. Logic may be encoded in a computer readable medium, which may refer to any medium that participates in providing instructions to processor 612 for execution. Such a medium may take many forms, including but not limited to, non-volatile media, volatile media, and transmission media. In various implementations, non-volatile media includes optical, or magnetic disks, or solid-state drives, volatile media includes dynamic memory, such as system memory component 614, and transmission media includes coaxial cables, copper wire, and fiber optics, including wires that include bus 602. In an embodiment, the logic is encoded in non-transitory computer readable medium. In an example, transmission media may take the form of acoustic or light waves, such as those generated during radio wave, optical, and infrared data communications.

Some common forms of computer readable media include, for example, floppy disk, flexible disk, hard disk, magnetic tape, any other magnetic medium, CD-ROM, any other optical medium, punch cards, paper tape, any other physical medium with patterns of holes, RAM, PROM, EEPROM, FLASH-EEPROM, any other memory chip or cartridge, or any other medium from which a computer is adapted to read.

In various embodiments of the present disclosure, execution of instruction sequences to practice the present disclosure may be performed by computer system 600. In various other embodiments of the present disclosure, a plurality of computer systems 600 coupled by communication link 618 to the network (e.g., such as a LAN, WLAN, PTSN, and/or various other wired or wireless networks, including telecommunications, mobile, and cellular phone networks) may perform instruction sequences to practice the present disclosure in coordination with one another.

Furthermore, resource provisioner 110 may be deployed in various ways. Where applicable, various embodiments provided by the present disclosure may be implemented using hardware, software, or combinations of hardware and software. Also where applicable, the various hardware components and/or software components set forth herein may be combined into composite components including software, hardware, and/or both without departing from the spirit of the present disclosure. Where applicable, the various hardware components and/or software components set forth herein may be separated into sub-components including software, hardware, or both without departing from the spirit of the present disclosure. In addition, where applicable, it is contemplated that software components may be implemented as hardware components, and vice-versa.

Application software in accordance with the present disclosure may be stored on one or more computer readable mediums. It is also contemplated that the application software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Changes may be made in form and detail without departing from the scope of the present disclosure. Thus, the present disclosure is limited only by the claims.

What is claimed is:

1. A system for provisioning resources in a cloud environment, the system comprising:
   a non-transitory memory; and
   one or more hardware processors coupled to the non-transitory memory and configured to read instructions from the non-transitory memory to cause the system to perform operations comprising:
      receiving from an application platform running in a cloud environment a request for one or more cloud resources, wherein the request does not specify whether to provision physical computing machines or virtual machines for the application platform;
      identifying a set of provision policies for provisioning cloud resources, the set of provision policies specific to the application platform;
      determining whether to approve the request for one or more cloud resources, the one or more cloud resources being at least one of one or more physical computing machines or one or more virtual machines; and
      in response to a determination that the request has been approved, determining, based on the set of provision policies specific to the application platform, whether to provision a first set of physical computing machines or a second set of virtual machines for the application platform;
      sending a first communication to a metal-as-a-service (MAAS) provider to cause the MAAS provider to provision the first set of physical computing machines for the application platform;
      receiving first information identifying the first set of physical computing machines from the MAAS provider;
      sending a second communication to a cloud broker to cause the cloud broker to provision the second set of virtual machines for the application platform;
      receiving second information identifying the second set of virtual machines from the cloud broker; and
      in response to the request, sending the first and second information to the application platform, whereby the application platform uses the first information to access the first set of physical computing machines and uses the second information to access the second set of virtual machines.

2. The system of claim 1, wherein the cloud broker communicates with a set of service providers to launch the second set of virtual machines.

3. The system of claim 2, wherein the first communication to the MAAS provider causes the MAAS provider to: (i) configure the first set of physical computing machines for the application platform, and (ii) transmit the first information identifying the first set of configured physical computing machines, and
   wherein the application platform uses the first information to consume the first set of configured physical computing machines.

4. The system of claim 3, wherein the first identifying information includes an Internet Protocol (IP) address of a configured physical computing machine of the first set of configured physical computing machines.

5. The system of claim 3, wherein the first communication to the MAAS provider further causes the MAAS provider to load an operating system onto a physical computing machine of the first set of physical computing machines.

6. The system of claim 2, wherein the second communication to the cloud broker causes the cloud broker to: (i) identify, based on the set of provision policies, a first service provider to launch at least one virtual machine of the second set of virtual machines, and (ii) transmit the second information identifying the at least one virtual machine of the second set of virtual machines, and
   wherein the application platform uses the second information to consume the at least one virtual machine of the second set of virtual machines.

7. The system of claim 1, wherein the one or more hardware processors coupled to the non-transitory memory and configured to read instructions from the non-transitory memory further cause the system to perform operations comprising:
   receiving a certificate that identifies the application platform;
   searching a registry to determine whether the application platform identified in the certificate is a valid requester, the registry including a list of valid requestors,
   in response to a determination that the application platform is not a valid requestor, rejecting the request; and
   in response to a determination that the application platform is a valid requestor, authenticating the request, and
   wherein the set of provision policies is identified after the request is authenticated.

8. A method of provisioning resources in a cloud environment, the method comprising:
   receiving from an application platform running in a cloud environment a request for one or more cloud resources, wherein the request does not specify whether to provision physical computing machines or virtual machines for the application platform;
   identifying, by one or more processors, a set of provision policies for provisioning cloud resources, the set of provision policies specific to the application platform;
   determining whether to approve the request for one or more cloud resources, the one or more cloud resources being at least one of one or more physical computing machines or one or more virtual machines; and
   in response to a determination that the request has been approved, determining, based on the set of provision policies specific to the application platform, to provision a first set of physical computing machines and a second set of virtual machines for the application platform;
   sending a first communication to a metal-as-a-service (MAAS) provider to cause the MAAS provider to provision the first set of physical computing machines for the application platform;

receiving first information identifying the first set of physical computing machines from the MAAS provider;

sending a second communication to a cloud broker to cause the cloud broker to provision the second set of virtual machines for the application platform;

receiving second information identifying the second set of virtual machines from the cloud broker; and in response to the request, sending the first and second information to the application platform, whereby the application platform uses the first information to access the first set of physical computing machines and uses the second information to access the second set of virtual machines.

9. The method of claim 8, wherein the cloud broker communicates with a set of service providers to launch the set of virtual machines.

10. The method of claim 9, wherein the first communication to the MAAS provider causes the MAAS provider to: (i) configure the first set of physical computing machines for the application platform, and (ii) transmit the first information identifying the first set of configured physical computing machines, and wherein the application platform uses the first information to consume the first set of configured physical computing machines.

11. The method of claim 10, wherein the first communication to the MAAS provider further causes the MAAS provider to load an operating system onto a physical computing machine of the first set of physical computing machines.

12. The method of claim 9, wherein the second communication to the cloud broker causes the cloud broker to: (i) identify, based on the set of provision policies, a first service provider to launch at least one virtual machine of the second set of virtual machines, and (ii) transmit the second information identifying the at least one virtual machine of the second set of virtual machines, and wherein the application platform uses the second information to consume the at least one virtual machine of the second set of virtual machines.

13. The method of claim 8, wherein the application platform is a platform-as-a-service.

14. A non-transitory machine-readable medium comprising a first plurality of machine-readable instructions that when executed by one or more processors is adapted to cause the one or more processors to perform a method comprising:

receiving from an application platform running in a cloud environment a request for one or more cloud resources, wherein the request does not specify whether to provision physical computing machines or virtual machines for the application platform;

identifying a set of provision policies for provisioning cloud resources, the set of provision policies specific to the application platform;

determining whether to approve the request for one or more cloud resources, the one or more cloud resources being at least one of one or more physical computing machines or one or more virtual machines; and in response to a determination that the request has been approved, determining, based on the set of provision policies specific to the application platform, to provision a first set of physical computing machines and a second set of virtual machines for the application platform;

sending a first communication to a metal-as-a-service (MAAS) provider to cause the MAAS provider to provision the first set of physical computing machines for the application platform;

receiving first information identifying the first set of physical computing machines from the MAAS provider;

sending a second communication to a cloud broker to cause the cloud broker to provision the second set of virtual machines for the application platform;

receiving second information identifying the second set of virtual machines from the cloud broker; and in response to the request, sending the first and second information to the application platform, whereby the application platform uses the first information to access the first set of physical computing machines and uses the second information to access the second set of virtual machines.

15. The system of claim 1, wherein a first policy of the set of provision policies specific to the application platform specifies the provisioning of the first set of physical computing machines for the application platform if a first condition is satisfied, and a second policy of the set of provision policies specific to the application platform specifies the provisioning of the second set of virtual machines for the application platform if a second condition is satisfied.

16. The system of claim 1, wherein the first information includes an internet protocol (IP) address of a physical computing machine of the first set of physical computing machines.

17. The system of claim 1, wherein the second information includes an IP address of a virtual machine of the second set of virtual machines.

18. The system of claim 1, wherein the one or more hardware processors coupled to the non-transitory memory and configured to read instructions from the non-transitory memory further cause the system to perform operations comprising:

inserting a private key into a virtual machine of the second set of virtual machines, wherein sending the second information includes sending a public key to the application platform.

* * * * *